(12) United States Patent
Takatsuka

(10) Patent No.: US 9,623,347 B2
(45) Date of Patent: Apr. 18, 2017

(54) CENTRIFUGE THAT ROTATES STORAGE CONTAINER WHILE APPLYING ULTRASONIC WAVES

(71) Applicant: THINKY CORPORATION, Tokyo (JP)

(72) Inventor: Takayuki Takatsuka, Tokyo (JP)

(73) Assignee: THINKY CORPORATION, Tokyo (JP)

( * ) Notice: Subject to any disclaimer, the term of this patent is extended or adjusted under 35 U.S.C. 154(b) by 0 days.

(21) Appl. No.: 14/417,444

(22) PCT Filed: Aug. 21, 2013

(86) PCT No.: PCT/JP2013/072241
§ 371 (c)(1),
(2) Date: Jan. 26, 2015

(87) PCT Pub. No.: WO2014/038373
PCT Pub. Date: Mar. 13, 2014

(65) Prior Publication Data
US 2015/0190735 A1 Jul. 9, 2015

(30) Foreign Application Priority Data

Sep. 10, 2012 (JP) .................................. 2012-198047

(51) Int. Cl.
*B01D 19/00* (2006.01)
*B01F 11/02* (2006.01)
(Continued)

(52) U.S. Cl.
CPC ..... *B01D 19/0057* (2013.01); *B01D 19/0078* (2013.01); *B01F 9/04* (2013.01);
(Continued)

(58) Field of Classification Search
CPC ............ B01D 19/0057; B01D 19/0052; B01D 19/0078; B01F 11/02; B04B 5/02; B04B 5/10; B04B 9/12
(Continued)

(56) References Cited

U.S. PATENT DOCUMENTS 3,448,747 A * 6/1969 Isaacson ................... B08B 3/12
134/1
4,584,064 A * 4/1986 Ciais ...................... B01D 1/222
159/22

(Continued)

FOREIGN PATENT DOCUMENTS

| CN | 2143329 | 10/1993 |
|---|---|---|
| CN | 1411899 A | 4/2003 |

(Continued)

OTHER PUBLICATIONS

International Search Report dated Nov. 19, 2013 filed in PCT/JP2013/072241.

(Continued)

*Primary Examiner* — Walter D Griffin
*Assistant Examiner* — Shuyi S Liu
(74) *Attorney, Agent, or Firm* — Rankin, Hill & Clark LLP

(57) ABSTRACT

Provided is a centrifuge that preferably performs processes such as dispersion of a material to be processed while enhancing convenience for users. A centrifuge 1 of the present invention includes an ultrasonic wave generation source 10 that generates ultrasonic waves and a storage container 20 that stores a material to be processed M. The centrifuge 1 of the present invention also includes a rotation mechanism 30. The rotation mechanism 30 rotates the storage container 20 around a rotation axis L tilted relative to a virtual line V extended in a vertical direction in such a (Continued)

manner that the ultrasonic waves from the ultrasonic wave generation source 10 are constantly applicable to the material to be processed M.

20 Claims, 5 Drawing Sheets

(51) Int. Cl.
*B04B 5/10* (2006.01)
*B01F 9/04* (2006.01)
*B01F 9/08* (2006.01)
*B01F 9/00* (2006.01)

(52) U.S. Cl.
CPC ............ *B01F 9/08* (2013.01); *B01F 11/0225* (2013.01); *B01F 11/0258* (2013.01); *B01F 11/0283* (2013.01); *B04B 5/10* (2013.01); *B01F 2009/0063* (2013.01)

(58) Field of Classification Search
USPC ......... 494/19, 47, 62; 96/175; 366/108, 110, 366/111, 113, 114, 116
See application file for complete search history.

(56) References Cited

U.S. PATENT DOCUMENTS

| 4,836,684 | A | * | 6/1989 | Javorik | ...................... B08B 3/12 134/1 |
| 5,176,446 | A | * | 1/1993 | Chiba | .................. B01F 13/0818 366/114 |
| 7,735,543 | B2 | * | 6/2010 | Farkas | .................... B22C 15/10 164/203 |
| 2005/0095181 | A1 | | 5/2005 | Lautenschlager | |
| 2006/0060520 | A1 | * | 3/2006 | Bomberger | ............. A61M 1/34 210/321.87 |
| 2009/0281663 | A1 | * | 11/2009 | Robida | ......................... 700/265 |
| 2010/0124142 | A1 | * | 5/2010 | Laugharn et al. | ............. 366/108 |
| 2013/0289282 | A1 | | 10/2013 | Raston | |

FOREIGN PATENT DOCUMENTS

| DE | 766260 | A | | 5/1954 | |
| DE | 2425985 | A1 | * | 12/1975 | ............. B65D 39/12 |
| EP | 1374991 | A1 | | 1/2004 | |
| JP | S61025629 | | | 2/1986 | |
| JP | S63143929 | | | 6/1988 | |
| JP | H06170203 | | | 6/1994 | |
| JP | 2001347152 | A2 | | 12/2001 | |
| JP | 2006263697 | A2 | | 10/2006 | |
| WO | WO 0025125 | A1 | * | 5/2000 | ............. B01F 11/02 |
| WO | 2004002614 | A1 | | 1/2004 | |
| WO | 2012034164 | A2 | | 3/2012 | |

OTHER PUBLICATIONS

Chinese Office Action issued on Mar. 2, 2016 for the corresponding Chinese Patent Application No. 201380040937.5.
Extended European Search Report issued on Mar. 21, 2016 for the corresponding EP Patent Application No. 13835717.3.

* cited by examiner

ROTATION ANGLE OF GEAR 533

CENTRIFUGE THAT ROTATES STORAGE CONTAINER WHILE APPLYING ULTRASONIC WAVES

TECHNICAL FIELD

The present invention relates to a centrifuge that rotates and processes a material to be processed.

BACKGROUND ART

There have been proposed various types of processing devices that perform processes such as agitation, defoaming, and dispersion of a material to be processed. One of them is a type of device using a centrifugal force (hereinafter referred to as centrifuge). Patent Literature 1 discloses this type of centrifuge. In the centrifuge, an ultrasonic wave generation source with an agitating blade is inserted into an agitation vessel. Then, while ultrasonic waves are applied to the material to be processed, the agitation vessel is rotated around a rotation axis disposed in the vertical direction. The centrifuge configured as described above is considered to efficiently disperse the material to be processed.

CITATION LIST

Patent Literature

PATENT LITERATURE 1: JP-A-2001-347152

SUMMARY OF INVENTION

Problems to be Solved by the Invention

However, the centrifuge disclosed in Patent Literature 1 needs to use the agitating blade for sufficient convection of the material to be processed. This requires the agitating blade of a complicated shape to be cleaned after the processing of the material to be processed, which becomes a burden on the user. In addition, the centrifuge may cause a problem of cost increase by the provision of the agitating blade. Further, the centrifuge may result in material loss due to adhesion of material to the agitating blade.

The present invention is devised in light of the foregoing circumstances. An object of the present invention is to provide a centrifuge that preferably performs processes such as dispersion of a material to be processed while enhancing convenience for users.

Solutions to the Problems

A centrifuge according to an aspect of the invention includes: an ultrasonic wave generation source that generates ultrasonic waves; a storage container that stores a material to be processed; and a rotation mechanism that rotates the storage container around a rotation axis tilted relative to a virtual line extended in a vertical direction in such a manner that the ultrasonic waves from the ultrasonic wave generation source are constantly applicable to the material to be processed.

In the centrifuge, the storage container storing the material to be processed is rotated by the rotation mechanism around the rotation axis line tilted relative to the virtual line extended in the vertical direction. In addition, at the centrifuge, ultrasonic waves generated from the ultrasonic wave generation source can be applied to the material to be processed during rotation of the storage container. That is, at the centrifuge, ultrasonic waves can be applied to the material to be processed while the material to be processed is entirely convected. Therefore, the centrifuge can preferably process the material to be processed.

In the centrifuge, the ultrasonic wave generation source may include a holding unit that holds a medium, and at least part of the storage container may be arranged in the medium.

In the centrifuge, the ultrasonic waves to be applied to the material to be processed may be changed during rotation of the storage container.

In the centrifuge, the changes in the ultrasonic waves to be applied to the material to be processed during the rotation of the storage container may be made by one or a combination of two or more of the following A) to C):

A) an oscillator included in the ultrasonic wave generation source is located eccentric to the holding unit;

B) the ultrasonic waves generated by the ultrasonic wave generation source vary in intensity, and C) the ultrasonic waves generated by the ultrasonic wave generation source vary in frequency.

In the centrifuge, a center line of the storage container and the rotation axis may be separated from each other.

In the centrifuge, rotation speed of the storage container may change in a periodic manner.

Advantageous Effects of the Invention

According to the present invention, it is possible to provide a centrifuge that preferably performs processes such as dispersion of a material to be processed while enhancing convenience for users.

DESCRIPTION OF EMBODIMENTS

Embodiments of the present invention will be described below with reference to the accompanying drawings. However, the present invention is not limited to the following embodiments. That is, all of the configurations described below in relation to the embodiments are not necessarily essential to the present invention. The present invention includes arbitrary combinations of the following embodiments and modifications of the foregoing embodiments without deviating from the scope of the present invention.

(1) Configuration of Centrifuge 1

Figure 1:
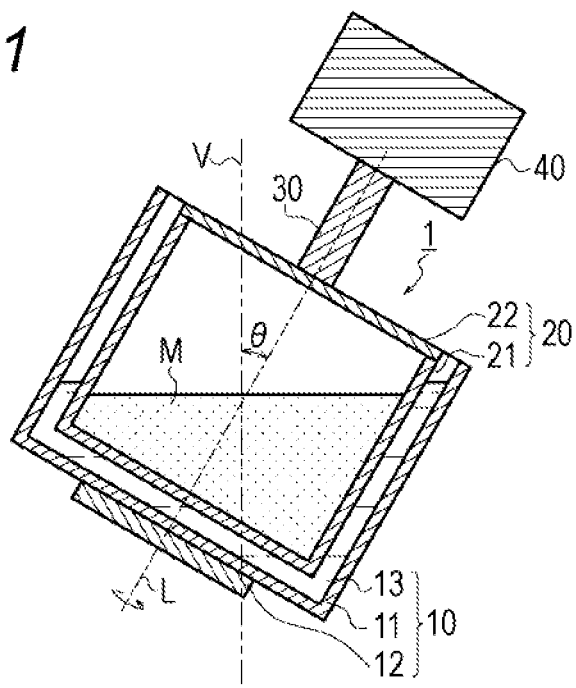
FIG. 1 is a schematic cross-sectional view of main parts of a centrifuge according to an embodiment.
Figure 3:
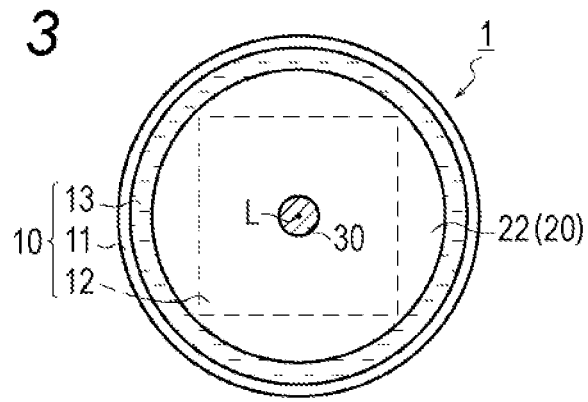
FIG. 3 is a schematic view of main parts of the centrifuge as seen from the direction parallel to a rotation axis.

Configuration of a centrifuge 1 in the embodiment will be described below. The centrifuge 1 includes an ultrasonic wave generation source 10 that generates ultrasonic waves, a storage container 20, and a rotation mechanism 30 as illustrated in FIGS. 1 and 3. The storage container 20 holds a material to be processed M in such a manner that the ultrasonic waves from the ultrasonic wave generation source 10 can be constantly applied to the material to be processed M. The rotation mechanism 30 rotates the storage container 20 around a rotation axis L. The rotation axis L is a virtual straight line that is tilted relative to a virtual line V as a virtual straight line extended in the vertical direction. The centrifuge 1 also includes a drive source 40 that generates a rotational force and a control mechanism 50 that controls the ultrasonic wave generation source 10 and the drive source 40.

The centrifuge 1 rotates the storage container 20 holding the material to be processed M while applying ultrasonic waves to the material to be processed M, thereby to perform processes such as agitation, defoaming, dispersion of the material to be processed M.

The ultrasonic wave generation source 10 includes a bottomed holding unit 11 with an opening at one end and an oscillator 12 that is arranged on the holding unit 11 to oscillate ultrasonic waves, as illustrated in FIGS. 1 and 3.

The holding unit 11 is composed of a metal and the like and holds a medium 13 as water or a liquid such as a solvent as illustrated in FIGS. 1 and 3. The holding unit 11 has the opening at the vertical upper side. The holding unit 11 accepts the storage container 20 from the opening and rotates the storage container 20 in that state. The holding unit 11 may be formed in a circular cylindrical shape as illustrated in the drawings, and the center line as a virtual straight line passing through the center of the circular cylinder is set along the rotation axis L. However, the shape of the holding unit 11 is not limited to a circular cylinder but may be any polygonal cylinder.

The oscillator 12 is arranged on the holding unit 11 as illustrated in FIGS. 1 and 3 to oscillate ultrasonic waves. The oscillation frequency of the oscillator 12 is set preferably between 20 kHz and 200 kHz, more preferably between 20 kHz and 50 kHz. The oscillator 12 may be arranged on the outer surface of the bottom of the holding unit 11 or at any other portion of the holding unit 11. The number of the oscillator 12 is not limited to one but may be two or more. At this time, the oscillator 12 may be configured in such a manner that the intensity of the ultrasonic waves to be oscillated changes periodically over time.

The storage container 20 includes a main body unit 21 and a lid portion 22 as illustrated in FIGS. 1 and 3. The main body unit 21 is fixed in a bottomed shape with an opening at one end and holds the material to be processed M. The lid portion 22 seals the opening in the main body unit 21 and an entire of lid portion 22 is not arranged in the medium 13 as illustrated in FIGS. 1, 4, 6, 7, 8, and 10. The rotation mechanism 30 is attached to the back surface of the lid portion 22 opposed to the bottom of the main body unit.

The main body unit 21 is composed of a material such as resin, metal, glass, or zirconia. The main body unit 21 is arranged in such a manner that the center line as a virtual straight line passing through the center of the main body unit 21 overlaps the rotation axis L, as illustrated in FIGS. 1 and 3. In addition, the main body unit 21 is stored from the bottom side thereof into the opening of the holding unit 11 in the ultrasonic wave generation source 10. At least part of the main body unit 21 is placed in the medium 13. The main body unit 21 may be formed in a circular cylindrical shape as illustrated in the drawings. However, the shape of the main body unit 21 is not limited to a circular cylinder but may be any polygonal cylinder.

The lid portion 22 is attached to the opening of the main body unit 21 as illustrated in FIGS. 1 and 3. The lid portion 22 is arranged in such a manner that the center line as a virtual straight line passing through the center of the lid portion 22 overlaps the rotation axis L. The lid portion 22 may be attached to the main body unit 21 in an arbitrary manner. For example, the lid portion 22 may be attached to the main body unit 21 using a screw mechanism not illustrated.

The rotation mechanism 30 rotates the storage container 20 around the rotation axis L by transferring a rotational force from the drive source 40 to the storage container 20. The rotation mechanism 30 is a circular columnar axis as illustrated in FIGS. 1 and 3. One end of the rotation mechanism 30 is attached to the lid portion 22 of the storage container 20. The rotation mechanism 30 is rotatably arranged along the rotation axis L.

Figure 2:
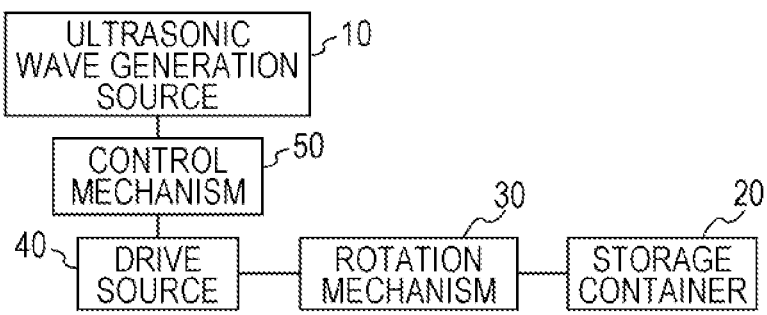
FIG. 2 is a block diagram for describing a configuration of the centrifuge.

The drive source 40 is composed of a motor. The drive source 40 generates a rotational force according to an instruction from the control mechanism 50 and transfers the rotational force to the rotation mechanism 30 as illustrated in FIGS. 1 and 2. The control mechanism 50 includes a microprocessor and the like. The control mechanism 50 provides an instruction to the drive source 40 as described above and also provides an instruction to the oscillator 12 to cause the oscillator 12 to oscillate ultrasonic waves.

The rotation axis L is tilted at an angle $\theta$ relative to the virtual line V as illustrated in FIG. 1. The angle $\theta$ is not limited under the condition that the angle is not zero. The angle $\theta$ is preferably set between 20 degrees and 70 degrees so that the material to be processed M is favorably processed.

(2) Material to be Processed M

The material to be processed M applicable to the embodiment is to behave as a fluid, but there is no particular limitation on the composition and the use of the material to be processed M. In particular, the centrifuge 1 can preferably disperse the material to be processed M. Therefore, the material to be processed M may be composed of a liquid material and a powder material, and, for example, may include a solvent and a carbon nanotube.

(3) Method for Processing the Material to be Processed M

The method for processing the material to be processed M at the centrifuge 1 will be described below. First, the user of the centrifuge 1 puts the material to be processed M into the main body unit 21 and attaches the lid portion 22 to the main body unit 21. Then, the user of the centrifuge 1 inserts the main body unit 21 from the bottom side into the holding unit 11 holding the medium 13. At that time, the user of the centrifuge 1 arranges at least part of the main body unit 21 in the medium 13 as illustrated in FIG. 1. The user of the centrifuge 1 also arranges the storage container 20 and the rotation mechanism 30 in such a manner that their respective center lines overlap the rotation axis L.

Next, the user of the centrifuge 1 operates the control mechanism 50 to instruct the oscillator 12 and the drive source 40 to operate. Accordingly, the oscillator 12 starts to oscillate ultrasonic waves and the drive source 40 generates a rotational force. The rotational force generated from the drive source 40 is transferred to the storage container 20 via the rotation mechanism 30. This allows the storage container 20 to rotate around the rotation axis L. At that time, the storage container 20 rotates with at least part thereof arranged in the medium 13.

As in such a manner as described above, the ultrasonic waves oscillated by the oscillator 12 are applied to the material to be processed M in the storage container 20 via the holding unit 11, the medium 13, and the main body unit 21. In addition to that, the material to be processed M in the storage container 20 is rotated around the rotation axis L. As a result, the material to be processed M is processed. After lapse of a predetermined period of time, the control mechanism 50 instructs the oscillator 12 and the drive source 40 to stop operation. Accordingly, the processing of the material to be processed M at the centrifuge 1 is completed.

(4) Operations and Advantages

Operations and advantages of the centrifuge 1 in the embodiment will be described below.

At the centrifuge 1, the storage container 20 storing the material to be processed M is rotated around the rotation axis L by the rotational force transferred from the drive source 40 via the rotation mechanism 30. In addition, at the centrifuge 1, during the rotation of the storage container 20 described above, the ultrasonic waves oscillated by the oscillator 12 are applied to the material to be processed M via the medium 13 and others.

At the centrifuge 1, the rotation axis L is tilted relative to the virtual line V along the vertical direction. Thus, the material to be processed M in the storage container 20 can be more entirely convected as compared to the case where the storage container 20 is rotated around the rotation axis along the virtual line V. At the centrifuge 1, the ultrasonic waves are applied to the material to be processed M being convected in such a manner. Accordingly, the centrifuge 1 makes it possible to preferably perform processes such as agitation, defoaming, dispersion, and the like of the material to be processed M without the use of an agitation blade. In particular, the centrifuge 1 favorably realizes dispersion of a powder material into a liquid material such as dispersion of a carbon nanotube into a solvent.

The advantages of the centrifuge 1 have been verified also experimentally. At the experiment, a solvent mixed with a carbon nanotube was used as the material to be processed M (hereinafter, the material to be processed M will be referred to as test material T). An experimental sample was prepared by processing the test material T for one hour at the centrifuge 1. A comparative sample was prepared by processing the test material T at a processing device configured in the same manner as the centrifuge 1 except that the storage container 20 was not rotated around the rotation axis L. The experimental sample and the comparative sample were compared to each other in such a manner that each of the sample was mixed with a SBR rubber into a film and was measured in conductivity.

As a result of the foregoing experiment, it has been found that the conductivity of the experimental sample was higher two or three digits than the conductivity of the comparative sample. The experimental result has revealed that the centrifuge 1 preferably dispersed the carbon nanotube into the solvent.

In addition, at the centrifuge 1, the oscillator 12 is arranged so as not to contact the material to be processed M in the storage container 20. Accordingly, the centrifuge 1 also has the advantage of facilitating cleaning work and the like after the use of the centrifuge 1 as well as eliminating the need for an agitation blade described above. Thus, the centrifuge 1 can provide high convenience to the users.

It has also been experimentally verified that the centrifuge 1 further favorably performed processes such as defoaming and dispersion of the material to be processed M by changing the intensity of the ultrasonic waves oscillated by the oscillator 12 over time. It is more advantageous to cause the changes in the intensity of the ultrasonic waves over time on a periodic basis.

(5-1) Modification Example 1

Figure 4:
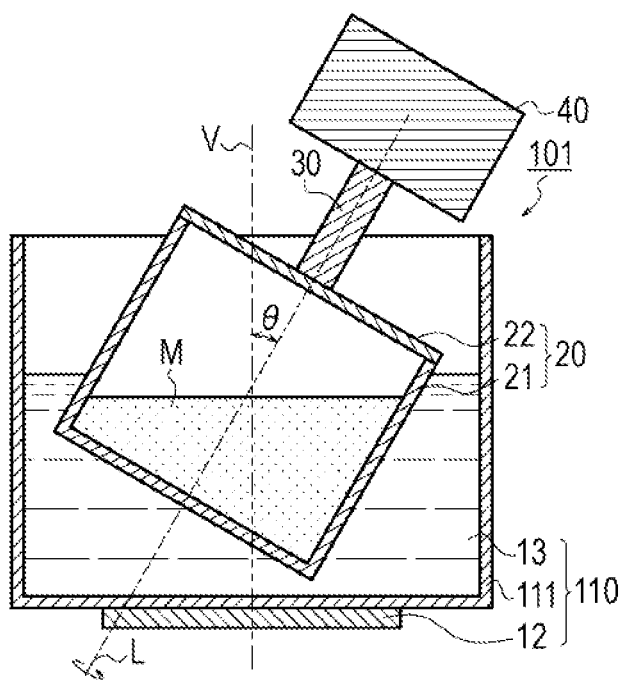
FIG. 4 is a schematic cross-sectional view of main parts of a centrifuge according to a modification example 1.

A centrifuge 101 according to a modification example is different from the centrifuge 1 in that the ultrasonic wave generation source 10 is replaced with an ultrasonic wave generation source 110 as illustrated in FIG. 4. The other components of the centrifuge 101 are the same as those of the centrifuge 1 and thus descriptions thereof will be omitted.

The ultrasonic wave generation source 110 includes a bottomed holding unit 11 with an opening at one end and the oscillator 12 arranged on the holding unit 11 as illustrated in FIG. 4. The holding unit 111 is composed of a metal or the like and holds the medium 13. In addition, the holding unit 111 is arranged in such a manner that a center line as a virtual straight line passing through the center of the holding unit 111 is parallel to the virtual line V. Further, the holding unit 111 receives the storage container 20 from the opening at the vertical upper side such that the storage container 20 can be rotated around the rotation axis L. The holding unit 111 may be formed in a circular cylinder shape or may be formed in any other shape, for example, square columnar shape.

(5-2) Modification Example 2

Figure 5:
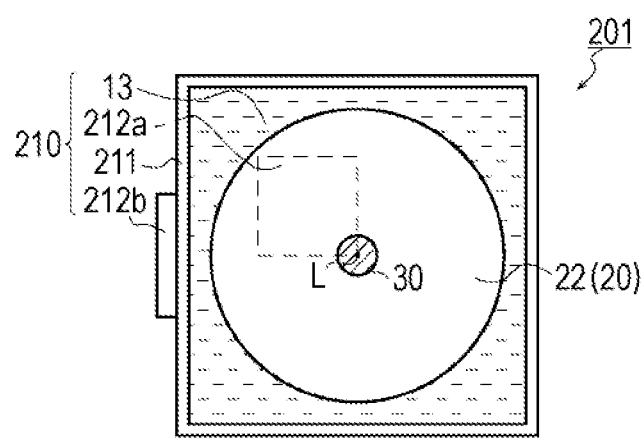
FIG. 5 is a schematic view of main parts of a centrifuge according to a modification example 2 as seen from the direction parallel to the rotation axis.

A centrifuge 201 according to a modification example is different from the centrifuge 1 in that the ultrasonic wave generation source 10 is replaced with an ultrasonic wave generation source 210 as illustrated in FIG. 5. The other components of the centrifuge 201 are the same as those of the centrifuge 1 and thus descriptions thereof will be omitted.

The ultrasonic wave generation source 210 includes a holding unit 211, and an oscillator 212a and an oscillator 212b that are arranged on the holding unit 211 as illustrated in FIG. 5.

The holding unit 211 is composed of a metal or the like and holds the medium 13. In addition, the holding unit 211 is arranged in such a manner that a center line as a virtual straight line passing through the center of the holding unit 211 is provided along the rotation axis L tilted at an angle θ relative to the virtual line V. Further, the holding unit 211 receives the storage container 20 from the opening at the vertical upper side such that the storage container 20 can be rotated around the rotation axis L. The holding unit 211 may be formed in a square columnar shape or any other shape.

The oscillation frequency of the oscillators 212a and 212b is set preferably between 20 kHz and 200 kHz, more preferably 20 kHz and 50 kHz. The oscillator 212a is arranged on part of the outer surface of the bottom of the holding unit 11. The oscillator 212b is arranged on part of the outer peripheral surface of the side portion of the holding unit 11.

By arranging the oscillators 212a and 212b in such a manner as described above, it is possible to positively produce spatial heterogeneity of ultrasonic waves in the holding unit 211 at the centrifuge 201. The arrangements of the oscillators 212a and 212b are not limited to the foregoing ones. The arrangements of the oscillators 212a and 212b merely need to be located eccentric to the holding unit 211. That is, the oscillators 212a and 212b may be arranged in any manner as far as they can produce positively spatial heterogeneity of ultrasonic waves in the holding unit 211. Alternatively, either the oscillator 212a or the oscillator 212b may be used or a plurality of oscillators not illustrated other than the oscillators 212a and 212b may be used.

At the centrifuge 201, spatial heterogeneity of ultrasonic waves is positively produced in the holding unit 211 as described above. As a result, the intensity of ultrasonic waves applied to the material to be processed M when the storage container 20 is rotated around the rotation axis L, changes over time (including periodic changes). It has been experimentally verified that the centrifuge 201 as described above performed processes such as defoaming and dispersion of the material to be processed M in a further favorable manner.

(5-3) Modification Example 3

Figure 6:
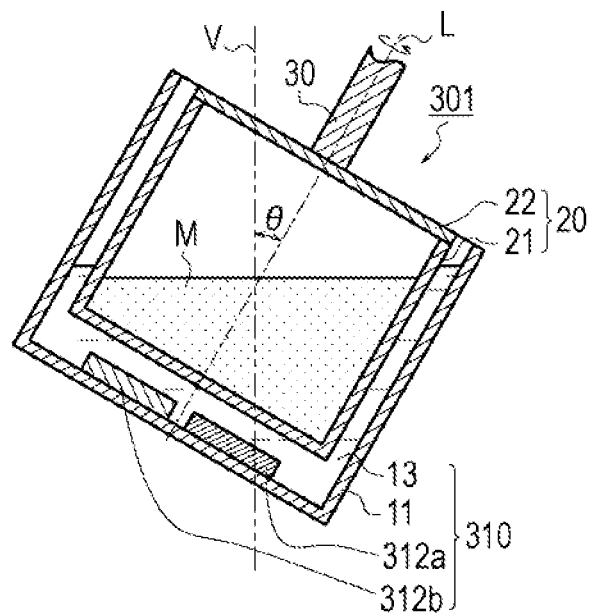
FIG. 6 is a schematic cross-sectional view of main parts of a centrifuge according to a modification example 3.

A centrifuge 301 according to a modification example 3 is different from the centrifuge 1 in that the ultrasonic wave generation source 10 is replaced with an ultrasonic wave generation source 310 as illustrated in FIG. 6. The other components of the centrifuge 301 are the same as those of the centrifuge 1 and thus descriptions thereof will be omitted.

The ultrasonic wave generation source 310 includes the holding unit 11, and an oscillator 312a and an oscillator 312b that are arranged on the holding unit 11 as illustrated in FIG. 6. The oscillator 312a and the oscillator 312b oscillate ultrasonic waves at different frequencies. The oscillation frequencies of the oscillators 312a and 312b are each set preferably between 20 kHz and 200 kHz. More preferably, the oscillation frequency of the oscillator 312a is set between 20 kHz and 30 kHz, and the oscillation frequency of the oscillator 312b is set between 35 kHz and 50 kHz. The oscillators 312a and 312b are arranged on the inner surface of the bottom of the holding unit 11.

By arranging the oscillators 312a and 312b as described above, it is possible to propagate a plurality of ultrasonic waves at different frequencies in the holding unit 11 at the centrifuge 301. The oscillators 312a and 312b may be arranged on any other portion of the holding unit 11 such as the outer surface of the bottom of the holding unit 11. Alternatively, the oscillators 312a and 312b may be arranged on the inner surface (of the bottom or the side portion) of the holding unit 11 to obtain the effect of preventing erosion of the holding unit 11.

The oscillators 312a and 312b may change in intensity of oscillated ultrasonic waves over time. Alternatively, one of the oscillator 312a and the oscillator 312b may oscillate ultrasonic waves, and after completion of the oscillation, the other may oscillate ultrasonic waves. Still alternatively, besides the oscillator 312a and the oscillator 312b, the ultrasonic wave generation source 310 may include an oscillator not illustrated at an oscillation frequency other than those of the oscillators 312a and 312b such that a larger number of ultrasonic waves with different frequencies can be propagated in the holding unit 11.

At the thus configured centrifuge 301, a plurality of ultrasonic waves with different frequencies is propagated in the holding unit 11. The effects of the ultrasonic waves used to process the material to be processed M vary depending on their frequencies. Therefore, the centrifuge 301 realizes more effective processing of the material to be processed M by the use of a plurality of ultrasonic waves with different frequencies.

(5-4) Modification Example 4

Figure 7:
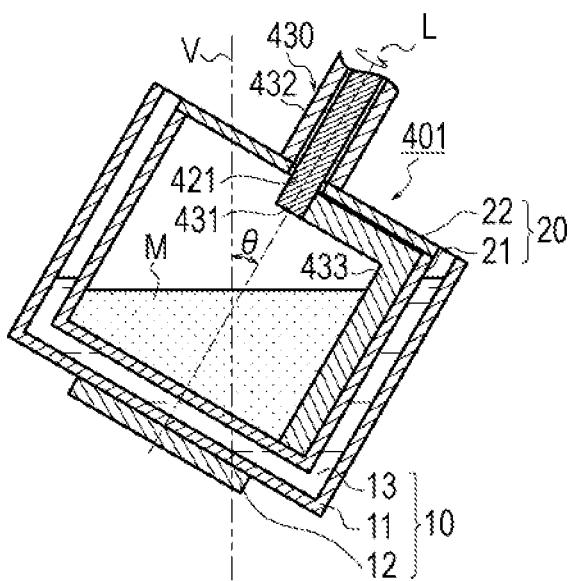
FIG. 7 is a schematic cross-sectional view of main parts of a centrifuge according to a modification example 4.

A centrifuge 401 according to a modification example 4 is different from the centrifuge 1 in that the lid portion 22 of the storage container 20 is provided with a hole portion 421 and the rotation mechanism 30 is replaced with a rotation mechanism 430, as illustrated in FIG. 7. The other components of the centrifuge 401 are the same as those of the centrifuge 1 and thus descriptions thereof will be omitted.

The hole portion 421 is a through hole that is provided along the center line as a virtual straight line passing through the center of the lid portion 22 as illustrated in FIG. 7.

The rotation mechanism 430 includes a shaft 431 that is arranged on the rotation axis L and passes through the hole portion 421, a rotation shaft 432, and a plate 433 as illustrated in FIG. 7. The rotation shaft 432 is configured to surround the shaft 431 and is rotatable around the rotation axis L. One end of the rotation shaft 432 is attached to the lid portion 22 of the storage container 20. The plate 433 is attached to one end of the shaft 431.

The shaft 431 does not rotate itself nor rotate the plate 433 attached to the one end thereof. The rotation shaft 432 is independent of the shaft 431 and is rotated together with the storage container 20 by a rotational force from the drive source 40. The plate 433 is arranged in the storage container 20. The plate 433 is extended along the lid portion 22, bent in the middle, and extended along the side surface of the main body unit 21. The portion of the plate 433 extended along the side surface of the main body unit 21 is put into the material to be processed M.

At the thus configured centrifuge 401, the plate 433 acts as a so-called baffle. Accordingly, at the centrifuge 401, the material to be processed M can be smoothly convected even when the storage container 20 is rotated at a high speed. Therefore, at the centrifuge 401, it is possible to rotate the storage container 20 at a high speed and enhance the effects of processes such as agitation of the material to be processed M.

(5-5) Modification Example 5

Figure 8:
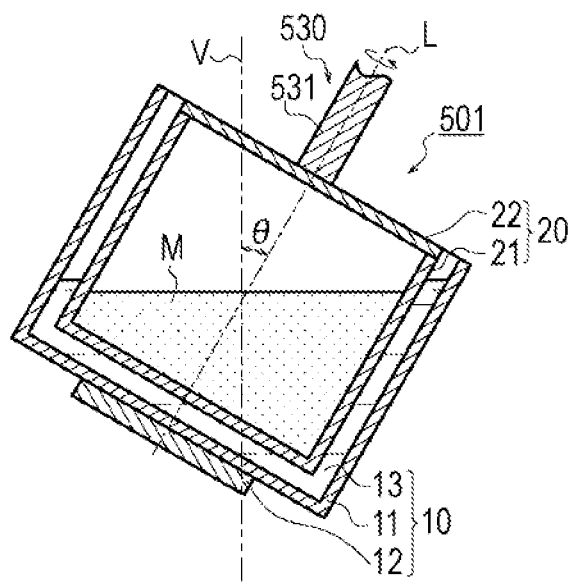
FIG. 8 is a schematic cross-sectional view of main parts of a centrifuge according to a modification example 5.
Figure 9:
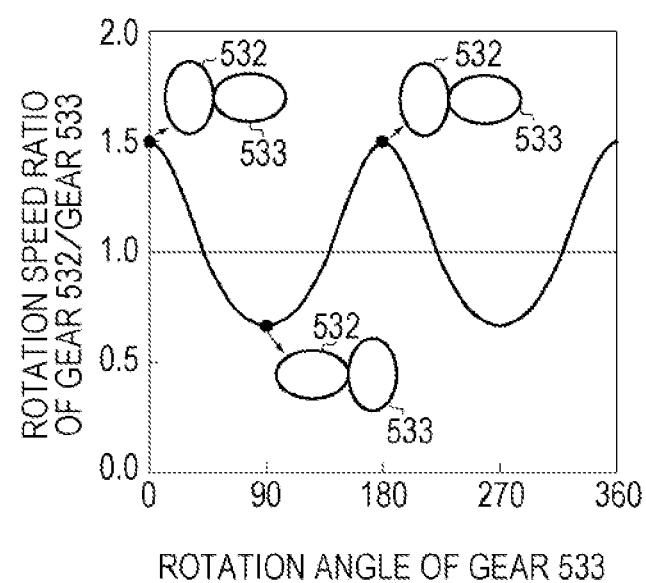
FIG. 9 is an illustrative diagram describing periodic changes in rotation speed of a storage container in the centrifuge according to the modification example 5.

A centrifuge 501 according to a modification example 5 is different from the centrifuge 1 in that the rotation mechanism 30 is replaced with a rotation mechanism 530, as illustrated in FIGS. 8 and 9. The other components of the centrifuge 501 are the same as those of the centrifuge 1 and thus descriptions thereof will be omitted.

The rotation mechanism 530 has a rotation shaft 531, a gear 532, and a gear 533 as illustrated in FIGS. 8 and 9. One end of the rotation shaft 531 is attached to the storage container 20. The rotation shaft 531 is arranged on the rotation axis L. The rotation shaft 531 is rotatable around the rotation axis L. The gear 532 is attached to the other end of the rotation shaft 531. The gear 533 engages with the gear 532 and is rotated by a rotational force generated by the drive source 40.

The gear 532 and the gear 533 constitute a so-called elliptic gear mechanism. The ratio of rotation speed of the gear 532 to the gear 533 varies depending on the rotation angle of the gear 533. Accordingly, at the centrifuge 501, when the drive source 40 rotates at a constant speed, the rotation speed of the storage container 20 changes in a periodic manner. For example, at the centrifuge 501 as illustrated in FIG. 9, while the drive source 40 rotates one time, the rotation speed of the storage container 20 changes by two periods. Accordingly, the centrifuge 501 makes it possible to periodically change the rotation speed of the storage container 20 in a short time.

At the thus configured centrifuge 501, the storage container 20 is rotated around the rotation axis L at changed rotation speeds. By rotating the storage container 20 at changed rotation speeds, the centrifuge 501 can improve a shearing force acting on the material to be processed M to process the material to be processed M in a more effective manner. Moreover, the centrifuge 501 can periodically change the rotation speed of the storage container 20 to realize the processing of the material to be processed M in a further effective manner.

At the centrifuge 501, the storage container 20 may be rotated at rotation speeds changed by a method other than using the gear 532 and the gear 533. For example, at the centrifuge 501, the rotation mechanism 30 may be used instead of the rotation mechanism 530 and the drive source 40 may be controlled by the control mechanism 50 to periodically change the rotation speed of the drive source 40 and also (periodically) change the rotation speed of the storage container 20.

(5-6) Modification Example 6

Figure 10:
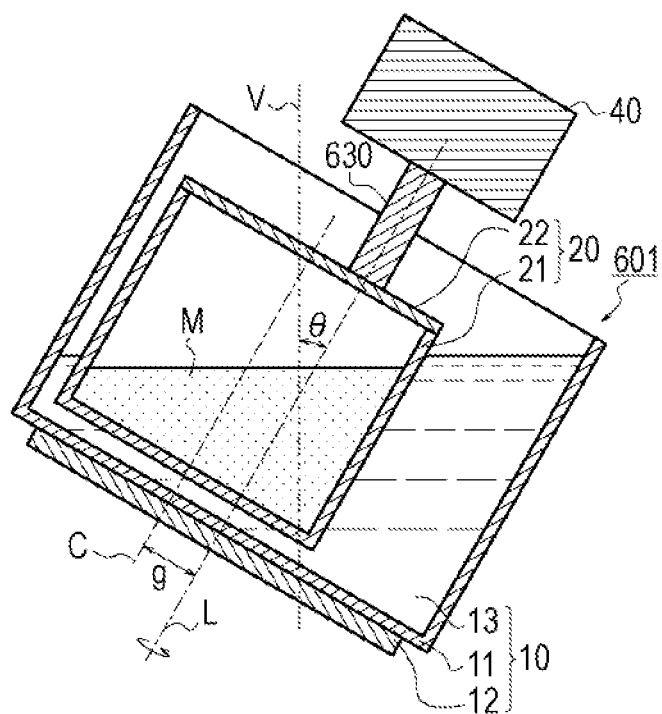
FIG. 10 is a schematic view of main parts of a centrifuge according to a modification example 6.

A centrifuge 601 according to a modification example 6 is different from the centrifuge 1 in that the rotation mechanism 30 is replaced with a rotation mechanism 630, as illustrated in FIG. 10. The other components of the centrifuge 601 are the same as those of the centrifuge 1 and thus descriptions thereof will be omitted.

The rotation mechanism 630 is a columnar shaft arranged along the rotation axis L as illustrated in FIG. 10. One end of the rotation mechanism 630 is attached to the lid portion 22, separated by a predetermined distance g from a center line C. The center line C is a virtual straight line passing through the center of the storage container 20 and is parallel to the rotation axis L. Further, the rotation mechanism 630 is connected to the drive source 40.

By attaching the rotation mechanism 630 to the lid portion 22 as described above, the storage container 20 can be decentered and rotated around the rotation axis L at the centrifuge 601. Accordingly, the centrifuge 501 facilitates convection of the material to be processed M to further effectively process the material to be processed M.

(5-7) Modification Example 7

Figure 11:
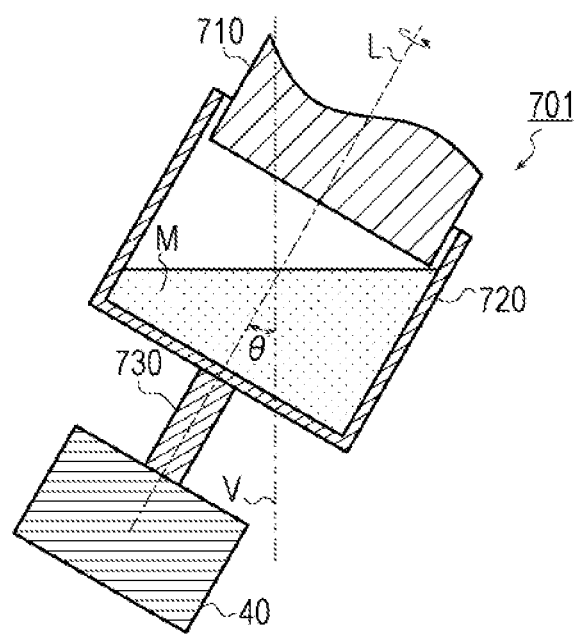
FIG. 11 is a schematic view of main parts of a centrifuge according to a modification example 7.

A centrifuge 701 according to a modification example 7 includes an ultrasonic wave generation source 710 that generates ultrasonic waves, a storage container 720, and a rotation mechanism 730, as illustrated in FIG. 11. The storage container 720 holds the material to be processed M in such a manner that ultrasonic waves from the ultrasonic wave generation source 710 can be constantly applied to the material to be processed M. The rotation mechanism 730 rotates the storage container 720 around the rotation axis L. The rotation axis L is a virtual straight line tilted relative to the virtual line V as a virtual straight line extended in the vertical direction. The centrifuge 701 includes the drive source 40 that generates a rotational force, and the control mechanism 50 that controls the ultrasonic wave generation source 710 and the drive source 40 as the centrifuge 1 does.

The ultrasonic wave generation source 710 is a so-called horn type as illustrated in FIG. 11, and oscillates ultrasonic waves. The storage container 720 is formed in a bottomed shape with an opening at one end and holds the material to be processed M. The storage container 720 is formed from a material such as resin, metal, glass, or zirconia. The storage container 720 is arranged in such a manner that the center line as a virtual straight line passing through the center of the storage container 720 overlaps the rotation axis L. Further, the storage container 720 receives the ultrasonic wave generation source 710 from the opening. The storage container 720 may be formed in a cylindrical shape as illustrated in the drawing. However, the shape of the storage container 720 is not limited to a circular cylinder but may be any polygonal cylinder.

The rotation mechanism 730 transfers a rotational force from the drive source 40 to the storage container 720 to rotate the storage container 720 around the rotation axis L. The rotation mechanism 730 is a columnar shaft as illustrated in FIG. 11. One end of the rotation mechanism 730 is attached to the bottom of the storage container 720. The rotation mechanism 730 is arranged along the rotation axis L. The rotation mechanism 730 is connected to the drive source 40.

A method for processing the material to be processed M at the centrifuge 701 will be described below. First, the user of the centrifuge 701 puts the material to be processed M into the storage container 720. Then, the user of the centrifuge 701 inserts the ultrasonic wave generation source 710 into the storage container 720.

Next, the user of the centrifuge 701 operates the control mechanism 50 to instruct the ultrasonic wave generation source 710 and the drive source 40 to operate. Accordingly, the ultrasonic wave generation source 710 starts to oscillate ultrasonic waves and the drive source 40 generates a rotational force. The rotational force generated from the drive source 40 is transferred to the storage container 720 via the rotation mechanism 730. This allows the storage container 720 to rotate around the rotation axis L.

As described above, the ultrasonic waves oscillated by the ultrasonic wave generation source 710 are applied to the material to be processed M in the storage container 720. In addition, the material to be processed M in the storage container 720 is rotated around the rotation axis L. Accordingly, the material to be processed M is processed. After lapse of a predetermined period of time, the control mechanism 50 instructs the ultrasonic wave generation source 710 and the drive source 40 to stop operation. Accordingly, the processing of the material to be processed M at the centrifuge 701 is completed.

Also in the centrifuge 701 described above, it is possible to favorably perform processes such as agitation, defoaming, and dispersion of the material to be processed M without use of an agitating blade.

(5-7) Other Modification Examples

As other modification examples, there are centrifuges of the present invention such as the centrifuge 1 with various additional components. For example, a centrifuge of the present invention can be provided in such a manner that the storage container 20 is provided with a revolving unit that revolves around a revolution axis as a virtual straight line different from the rotation axis L. In the centrifuge of the present invention with such a revolution function, it is possible to allow a centrifugal force from the revolution to act on the material to be processed M in a superimposing manner, thereby further improving the effects of processing the material to be processed M.

DESCRIPTION OF REFERENCE SIGNS

1 Centrifuge
10 Ultrasonic wave generation source
11 Holding unit
12 Oscillator
13 Medium
20 Storage container
21 Main body unit
22 Lid portion
30 Rotation mechanism
40 Drive source
50 Control mechanism
101 Centrifuge
110 Ultrasonic wave generation source
111 Holding unit
201 Centrifuge
210 Ultrasonic wave generation source
211 Holding unit
212a Oscillator
212b Oscillator
301 Centrifuge
310 Ultrasonic wave generation source
312a Oscillator
312b Oscillator
401 Centrifuge
421 Hole portion
430 Rotation mechanism
431 Shaft
432 Rotation shaft
433 Plate
501 Centrifuge
530 Rotation mechanism
531 Rotation shaft
532 Gear
533 Gear
601 Centrifuge
630 Rotation mechanism
701 Centrifuge
710 Ultrasonic wave generation source
720 Storage container
730 Rotation mechanism
C Center line
g Predetermined distance
L Rotation axis
M Material to be processed
T Test material
V Virtual line
θ Angle

The invention claimed is:
1. A centrifuge, comprising:
an ultrasonic wave generation source that generates ultrasonic waves;
a holding unit that is included in the ultrasonic wave generation source and holds a liquid medium, the holding unit being in direct contact with the liquid medium;
a storage container that stores a material to be processed;
a rotation mechanism comprising a shaft and a rotation axis, the rotation mechanism being configured to rotate the storage container around the rotation axis independently of the holding unit, the rotation axis being tilted 20 degrees or more and 70 degrees or less relative to a virtual line extended in a vertical direction in such a manner that the ultrasonic waves from the ultrasonic wave generation source are constantly applicable to the material to be processed via the liquid medium; and
a driving source that generates a rotational force and transfers the rotational force to the rotation mechanism,
wherein the storage container comprises a main body unit, an opening positioned at an upper side of the main body unit, and a lid that seals the opening;
at least part of the main body unit of the storage container is arranged in the liquid medium;
an entire of the lid of the storage container is not arranged in the liquid medium;
the shaft is in direct contact with the driving source at one end of the shaft and in direct contact with the lid at another end of the shaft to support the storage container; and
a center line of the holding unit and a center line of the shaft overlap with the rotation axis.
2. A method for processing a material, comprising:
arranging at least part of a main body unit of a storage container in a liquid medium held in and in direct contact with a holding unit included in an ultrasonic wave generation source that generates ultrasonic waves, the main body unit storing a material to be processed;
sealing an opening positioned at an upper side of the main body with a lid in such a manner that an entire of the lid is not arranged in the liquid medium;
attaching one end of a shaft of a rotation mechanism to a driving source, the driving source generating a rotational force and transferring the rotational force to the rotation mechanism, the one end being in direct contact with the driving source;
attaching another end of the shaft to the lid to support the storage container, the another end being in direct contact with the lid;
aligning a center line of the holding unit and a center line of the shaft to overlap with a rotation axis of the rotation mechanism; and
rotating, by the rotation mechanism, the storage container around the rotation axis independently of the holding unit, the rotation axis being tilted 20 degrees or more and 70 degrees or less relative to a virtual line extended in a vertical direction in such a manner that the ultrasonic waves from the ultrasonic wave generation source are constantly applicable to the material to be processed via the liquid medium.
3. A centrifuge, comprising:
an ultrasonic wave generation source that generates ultrasonic waves;
a holding unit that is included in the ultrasonic wave generation source and holds a liquid medium, the holding unit being in direct contact with the liquid medium;
a rotation mechanism comprising a shaft and a rotation axis, the rotation mechanism being configured to rotate a storage container around the rotation axis independently of the holding unit, the rotation axis being tilted 20 degrees or more and 70 degrees or less relative to a virtual line extended in a vertical direction in such a manner that at least part of the storage container storing a material to be processed is arranged in the liquid medium to allow the ultrasonic waves from the ultrasonic wave generation source to be constantly applied to the material to be processed via the liquid medium; and a driving source that generates a rotational force and transfers the rotational force to the rotation mechanism, wherein the storage container comprises a main body unit, an opening positioned at an upper side of the main body unit, and a lid that seals the opening;

at least part of the main body unit of the storage container is arranged in the liquid medium;

an entire of the lid of the storage container is not arranged in the liquid medium;

the shaft is in direct contact with the driving source at one end of the shaft and in direct contact with the lid at another end of the shaft to support the storage container; and a center line of the holding unit and a center line of the shaft overlap with the rotation axis.

4. The centrifuge according to claim 1, wherein the lid is attached to the main body unit by a screw mechanism.

5. The centrifuge according to claim 1, wherein the rotation mechanism is attached to an upper surface of the lid.

6. The centrifuge according to claim 1, wherein the ultrasonic wave generation source comprises a plurality of oscillators oscillating ultrasonic waves at frequencies different from each other.

7. The method according to claim 2, wherein the ultrasonic wave generation source comprises a plurality of oscillators oscillating ultrasonic waves at frequencies different from each other.

8. The centrifuge according to claim 3, wherein the ultrasonic wave generation source comprises a plurality of oscillators oscillating ultrasonic waves at frequencies different from each other.

9. The centrifuge according to claim 6, wherein the plurality of oscillators comprises:
a first oscillator oscillating ultrasonic waves at a first frequency being set between 20 kHz and 30 kHz; and
a second oscillator oscillating ultrasonic waves at a second frequency being set between 35 kHz and 50 kHz.

10. The method according to claim 7, wherein the plurality of oscillators comprises:
a first oscillator oscillating ultrasonic waves at a first frequency being set between 20 kHz and 30 kHz; and
a second oscillator oscillating ultrasonic waves at a second frequency being set between 35 kHz and 50 kHz.

11. The centrifuge according to claim 8, wherein the plurality of oscillators comprises:
a first oscillator oscillating ultrasonic waves at a first frequency being set between 20 kHz and 30 kHz; and
a second oscillator oscillating ultrasonic waves at a second frequency being set between 35 kHz and 50 kHz.

12. The centrifuge according to claim 1, wherein a center line passing through a center of the storage container is decentered with respect to the rotation axis, the center line being parallel to the rotation axis.

13. The method according to claim 2, wherein a center line passing through a center of the storage container is decentered with respect to the rotation axis, the center line being parallel to the rotation axis.

14. The centrifuge according to claim 3, wherein a center line passing through a center of the storage container is decentered with respect to the rotation axis, the center line being parallel to the rotation axis.

15. The centrifuge according to claim 1, wherein the storage container is rotated at variable speeds.

16. The method according to claim 2, further comprising changing a rotation speed of the storage container.

17. The centrifuge according to claim 3, wherein the storage container is rotated at variable speeds.

18. The centrifuge according to claim 1, wherein the rotation mechanism further comprises:
a non-rotating shaft arranged on the rotation axis; and
a plate attached to the non-rotating shaft, the plate being arranged in the storage container in such a manner that at least a portion of the plate is put into the material to be processed, the plate being not rotated together with the storage container and the shaft.

19. The method according to claim 2, wherein the rotation mechanism further comprises:
a non-rotating shaft arranged on the rotation axis; and
a plate attached to the non-rotating shaft, the plate being arranged in the storage container in such a manner that at least a portion of the plate is put into the material to be processed, the plate being not rotated together with the storage container and the shaft.

20. The centrifuge according to claim 3, wherein the rotation mechanism further comprises:
a non-rotating shaft arranged on the rotation axis; and
a plate attached to the non-rotating shaft, the plate being arranged in the storage container in such a manner that at least a portion of the plate is put into the material to be processed, the plate being not rotated together with the storage container and the shaft.

* * * * *